United States Patent
Oldfield et al.

(10) Patent No.: US 6,799,254 B2
(45) Date of Patent: Sep. 28, 2004

(54) MEMORY MANAGER FOR A COMMON MEMORY

(75) Inventors: Barry J Oldfield, Boise, ID (US); Robert A. Rust, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 09/808,711

(22) Filed: Mar. 14, 2001

(65) Prior Publication Data

US 2002/0133676 A1 Sep. 19, 2002

(51) Int. Cl.⁷ .............................. G06F 12/00
(52) U.S. Cl. ................ 711/151; 711/147; 711/148; 711/151; 711/153; 710/39; 710/57
(58) Field of Search ................ 711/147, 148, 711/151, 153; 710/39, 57

(56) References Cited

U.S. PATENT DOCUMENTS

| | | | | |
|---|---|---|---|---|
| 5,253,352 A | * | 10/1993 | Olson | 710/107 |
| 5,278,984 A | * | 1/1994 | Batchelor | 709/314 |
| 5,588,134 A | * | 12/1996 | Oneto et al. | 711/158 |
| 5,603,063 A | * | 2/1997 | Au | 710/52 |
| 5,748,901 A | * | 5/1998 | Afek et al. | 709/238 |
| 5,796,735 A | * | 8/1998 | Miller et al. | 370/395.4 |
| 5,911,051 A | * | 6/1999 | Carson et al. | 710/107 |
| 5,924,110 A | * | 7/1999 | Pike et al. | 711/2 |
| 5,937,205 A | * | 8/1999 | Mattson et al. | 710/106 |
| 5,938,723 A | * | 8/1999 | Hales et al. | 709/204 |
| 5,948,081 A | | 9/1999 | Foster | |
| 6,092,158 A | | 7/2000 | Harriman et al. | |
| 6,175,889 B1 | * | 1/2001 | Olarig | 710/309 |
| 6,209,065 B1 | * | 3/2001 | Van Doren et al. | 711/150 |
| 6,240,492 B1 | * | 5/2001 | Foster et al. | 711/149 |
| 6,272,584 B1 | * | 8/2001 | Stancil | 710/241 |
| 6,279,087 B1 | * | 8/2001 | Melo et al. | 711/146 |
| 6,317,806 B1 | * | 11/2001 | Audityan et al. | 711/101 |
| 6,341,301 B1 | * | 1/2002 | Hagan | 709/100 |
| 6,434,641 B1 | * | 8/2002 | Haupt et al. | 710/54 |
| 6,496,740 B1 | * | 12/2002 | Robertson et al. | 700/20 |
| 6,523,060 B1 | * | 2/2003 | Kao | 709/202 |

* cited by examiner

*Primary Examiner*—Donald Sparks
*Assistant Examiner*—Ngoc V Dinh

(57) ABSTRACT

The memory management technology controls, as described herein, access to and monitors availability of common memory resources. In particular, this hardware-based, memory-management technology manages memory access requests to a common memory shared by multiple requesting entities. This includes prioritizing and arbitrating such requests. It further includes minimizing latency of such requests. This abstract itself is not intended to limit the scope of this patent. The scope of the present invention is pointed out in the appending claims.

12 Claims, 4 Drawing Sheets

*(background)*

*(background)*

MEMORY MANAGER FOR A COMMON MEMORY

TECHNICAL FIELD

This invention relates to memory management technology for controlling access to and monitoring availability of memory resources. More particularly, this invention relates to memory management technology for managing memory access requests to a common memory shared by multiple requesting entities.

BACKGROUND

A typical computer system includes one or more common memory systems. Illustrated at 200 of FIG. 1 is a portion of such a computer system. This portion of a computer system illustrates memory resources that are shared by multiple devices and sub-systems.

In particular, the focus here is on primary memory rather than secondary memory. Examples of such primary memory include RAM, ROM, DRAM, SRAM, and other such physical memories. Herein, primary memory may be generally called "RAM", "main memory", or "system memory."

Such primary memory includes physical memory, which, for example, refers to the actual chips capable of holding data. Primary memory does not include virtual memory, which expands physical memory onto secondary memory. Examples of secondary memory includes hard drives, floppy disks, CD-ROM, or any other memory where memory access is significantly slower than that of primary memory.

Common Memory

Primary memory is often shared amongst multiple devices and sub-systems. This shared memory may be called a "common memory," such as common memory subsystem 201. The devices and sub-systems that may access the memory are generally called "agents" or "entities." Examples of agents are shown in FIG. 1, they include processor(s) 202, communications (Input\Output or I\O) device(s) 204, disk controller(s) 203, other hardware devices 205 (such as memory scrubbers), and the like. Each of these agents may send an access request to the common memory subsystem 201 in system 200 when an agent wishes to read from or write to memory.

FIG. 2 shows a general schematic view of components of common memory subsystem 201. In particular, the subsystem 201 includes an I/O unit 220, other memory hardware 224, and a memory 230. As the name suggests, the I/O unit 220 handles the subsystem's communications with agents. The memory 230 is the core of the subsystem. This is the actual memory. The other memory hardware 224 handles any other tasks that need to be performed, such as facilitating output of data from the memory 230 and facilitating access requests to the memory. These access requests typically involve a combination of tasks. Such tasks include one or more reads from and one or more writes to the memory.

To provide order to otherwise unregulated access to the common memory 230, the other memory hardware 224 may employ a memory management strategy. The most common strategy is to simply place all requests into a FIFO (first-in, first-out) queue. Therefore, in the order in which requests are received, each request gets to use the memory to perform its tasks.

Latency

Latency is the measure of time between the moment when a memory request is made until the moment that the result of such request is returned to the requesting agent. If an agent has its own memory that is unshared, one would expect the latency for a specified task to be the same each time that task is performed. However, when there is a memory shared amongst many agent, then the latency of such a task varies depending upon how long the task must wait to have access to the common memory.

Agents time-share the common memory subsystem 201. This means that each agent gets a slice of time to perform its tasks (as it has requested). If one assumes that there are agents waiting to use the memory, some of these uses are more urgent than other uses. Therefore, it is desirable to minimize such latency—particularly for such urgent uses.

There are other reasons a request to access memory may be delayed. There is additional waiting when the operational speeds of the memory subsystem 201, the agents 202–205, and the links between the subsystem and agents are not in-sync. For example, a processor may operate at 500 MHz, its link (called a bus) to the memory subsystem may operate at 100 MHz, and the memory subsystem may operate at 300 MHz. In this example, the components and links are operating at different speeds; therefore, there may be gaps between tasks performed by an access request.

Furthermore, additional delay is occurs because the memory's access protocol, which controls access to the memory. This protocol consumes several clock cycles to initiate and perform each read from memory. Likewise, it consumes several clock cycles to initiate and perform each write to memory. These clock cycles are merely overhead where no working data is read from or written to memory.

SUMMARY

Described herein is an improved memory management technology for controlling access to and monitoring availability of common memory resources. In particular, this hardware-based, memory-management technology manages memory access requests to a common memory shared by multiple requesting entities. This includes prioritizing and arbitrating such requests. It further includes minimizing latency of such requests.

This summary itself is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

DETAILED DESCRIPTION

The following description sets forth one or more specific embodiments of a memory manager of a common memory that incorporate elements recited in the appended claims. The embodiments are described with specificity in order to meet statutory requirements, such as written description, enablement, and best-mode. However, the description itself is not intended to limit the scope of this patent. Rather, the inventors have contemplated that the claimed invention might also be embodied in other ways, in conjunction with other present or future technologies.

An example of an embodiment of the memory manager of a common memory may be referred to as an "exemplary memory manager."

An Exemplary Memory Manager

Figure 1:
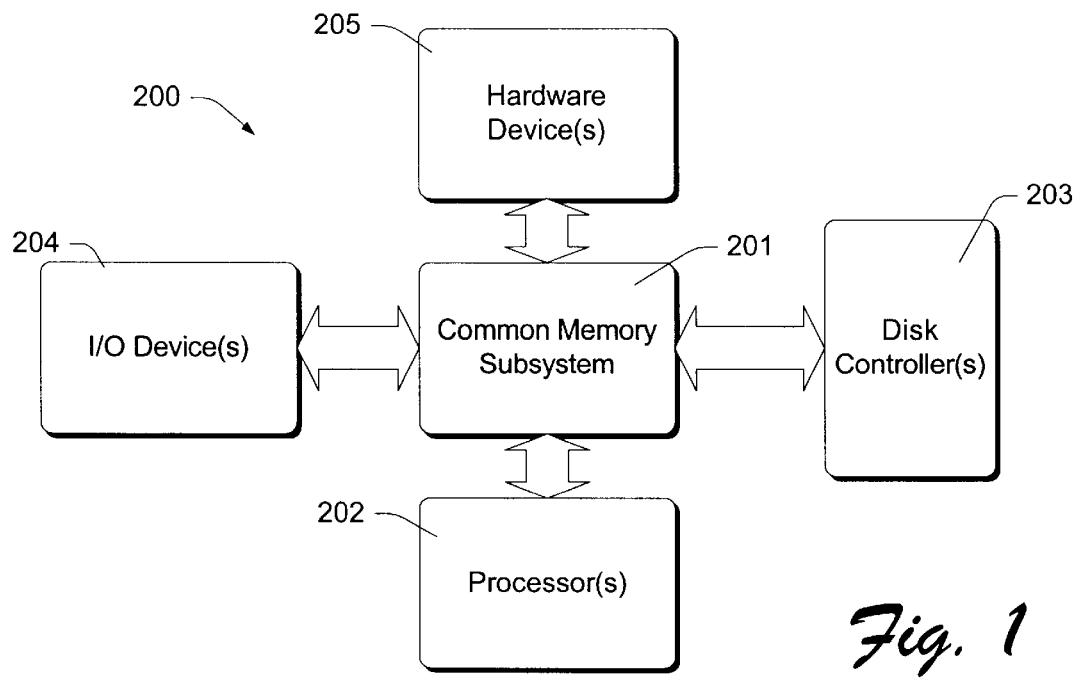
FIG. 1 is a block diagram of a portion of a typical computer system with agents sharing a common memory subsystem.
Figure 2:
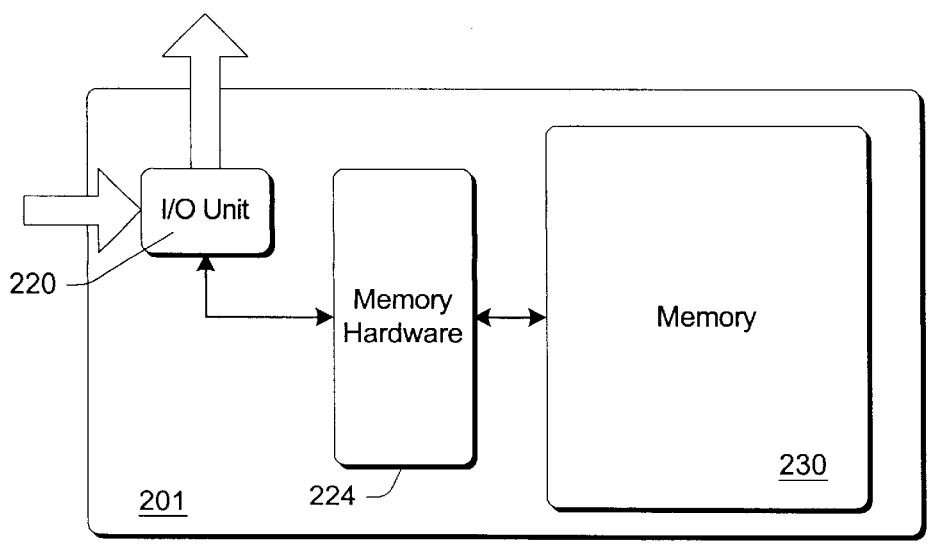
FIG. 2 is a block diagram of a typical common memory subsystem and its components.
Figure 3:
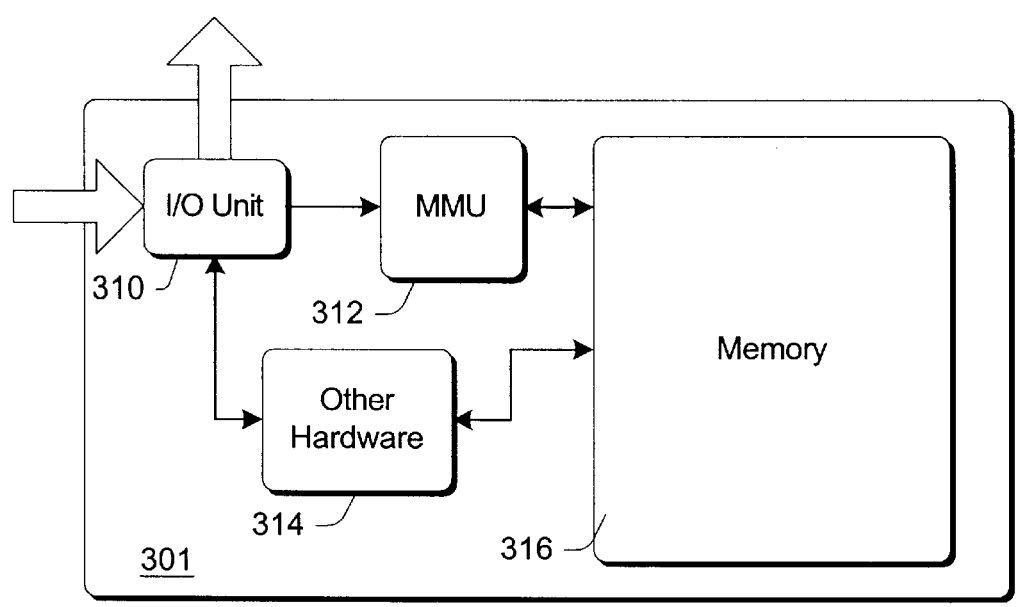
FIG. 3 is a block diagram of a common memory subsystem and its components, where the subsystem is an example of an embodiment of the invention claimed herein.

FIG. 3 illustrates a common memory subsystem 301 that includes an example of an embodiment of the memory manager of a common memory. The memory subsystem 301 includes a common memory 316, an I/O unit 310, a memory management unit 312, and other memory hardware 314.

The common memory 316 is the memory resource that is shared by multiple agents. The I/O unit 310 handles communications between the agents and the memory subsystem 301. The memory management unit 312 contains hardware-based logic for managing access to the memory 316. Such a unit may be called a MMU. It may also be called a memory-access arbitration unit (MAA unit). The other hardware 314 contains other memory-related hardware employed by the memory subsystem.

The I/O unit 310 and/or the other hardware 314 with the MMU 312 (or some combination thereof) may embody the exemplary manager. More particularly, the MMU, as a whole or some portion thereof, may embody the exemplary manager.

Figure 4:
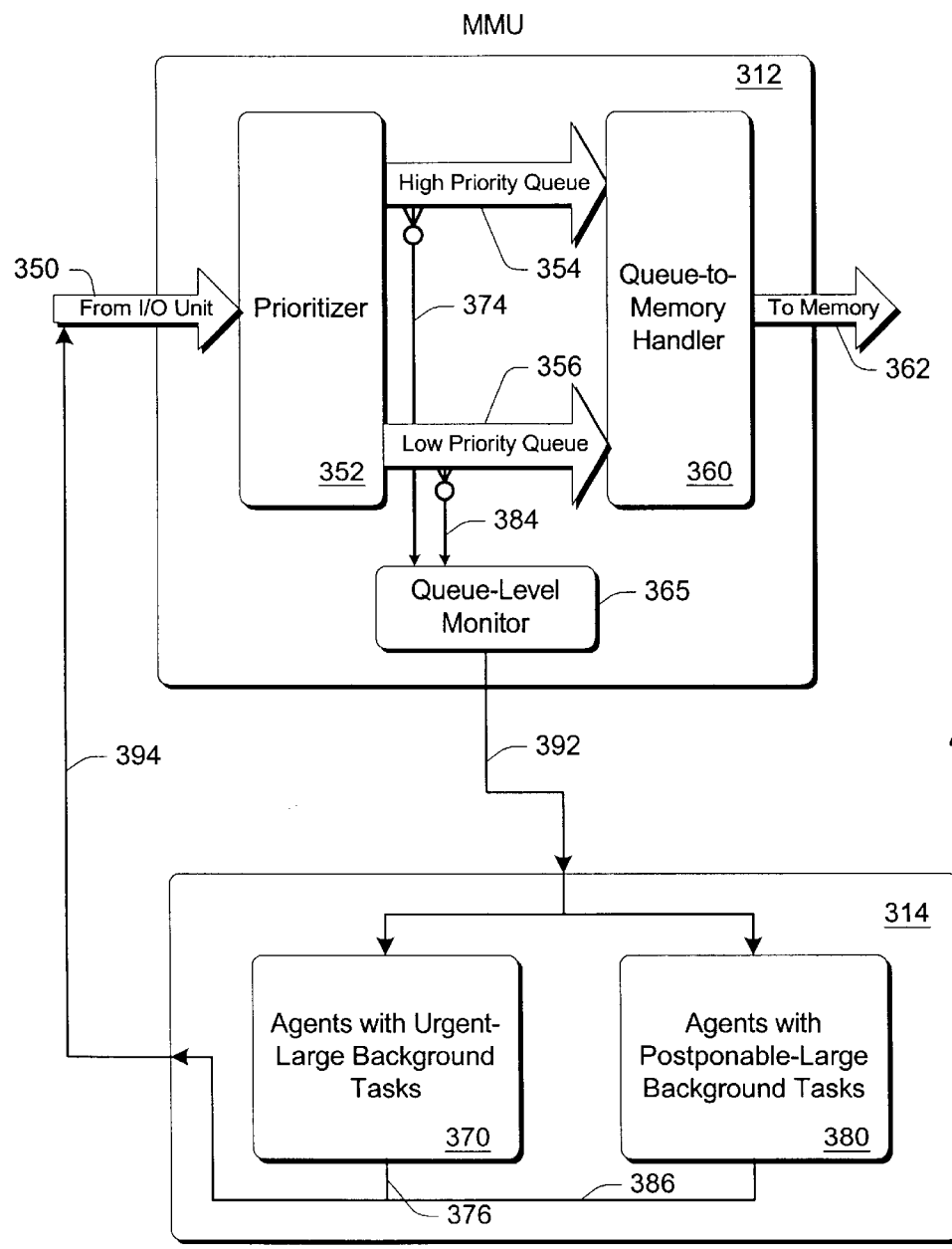
FIG. 4 is a block diagram of a memory management unit (MMU) of a common memory subsystem and a block diagram of a portion of other hardware of the memory system. The MMU is an example of at least part of an embodiment of the invention claimed herein. Furthermore, the other hardware is an example of at least part of an embodiment of the invention claimed herein

FIG. 4 shows a block diagram of the components of the MMU 312. Since the MMU 312 contains some or all of an embodiment of the exemplary manager, it is appropriate to focus attention on this portion of the common memory subsystem 301. FIG. 4 also shows a portion of the other hardware, in particular the background agents 370 and 380.

To gain access to the common memory 316 for read/writing, an agent sends a request to the MMU via the I/O unit 310. These requests typically involve one or more tasks. Such tasks include one or more reads from the memory and one or more writes to the memory.

Tasks and Requests

For this exemplary manager described herein, there are generally three types of requests. The types of request are based upon their tasks. The three types of task include: short-urgent; long-urgent; and long-postponable.

Some tasks are typically short and urgent ("short-urgent"). Short meaning that the task may be performed quickly and urgent meaning that other operations and functions are awaiting the results of the task before proceeding. A task is considered particularly urgent when waiting for the results of such task will stall the processor.

Delaying or interrupting these short-urgent tasks will typically harm the overall performance of the computer system. Examples of such tasks include nearly all requests from a processor because most of its memory accesses are quick and important (to the overall performance of the computer system). For example, suppose that a user may be waiting for a result to appear on the screen and the processor must quickly access memory to obtain that result. Any delay in displaying that result will impact the user's impression of the computer systems performance.

Another type of task is one that is large and urgent ("large-urgent"). Large meaning that the task is large and thus likely to be performed slowly. Typically, these tasks involve DMA activities where processes or other agents are awaiting the completion. Therefore, other operations and functions are awaiting the results of the task before proceeding.

Delaying or interrupting these large-urgent tasks will typically harm the overall performance of the computer system.

Still another type of task is one that is large and postponable ("large-postponable"). Postponable meaning that nearly no other operation or function is waiting for the results of the task. Typically, these tasks involve "housekeeping" duties, such as disk and data management where data is swapped into/out of memory.

Delaying or interrupting these large-postponable tasks will typically have no affect on the overall performance of the computer system. Examples of such tasks include disk management, data management, some DMA transfers where the results are not needed immediately, background disk parity calculations, data migration, rebuilding data for a disk array, and other such housekeeping duties. For example, suppose that a large amount of data is being copied from one disk drive to another for the purpose of data redundancy. The user is probably unaware that the background task is being performed; therefore, there appears to be little or no performance impact if this task completes in one minute or three hours.

MMU

FIG. 4 shows the MMU 312. It includes an input 350 from the I/O unit 310. A prioritizer 352 receives requests to access memory 316 from multiple agents via input 350. As the name implies, the prioritizer prioritizes the requests and directs them to one of two queues: high-priority queue 354 or low-priority queue 356. Of course, other embodiments of the exemplary manager may include more than two queues.

The prioritizer 352 determines the priority of each request based upon the tasks of the requests. Short-urgent requests are given high priority and, thus, are directed to the high-priority queue 354. Large-urgent and large-postponable requests are given lower priority and, thus, are directed to the low-priority queue 356. Alternatively, the large-urgent requests may be placed in the high priority queue.

In the exemplary manager, the priority determination is based upon the range of memory being addressed. A given range is allocated to each priority. All urgent requests (including short-urgent and large-urgent requests) operate in a given memory space, and large-postponable requests operate in different given memory space. Alternatively, short-urgent request may operate in a first memory space, large-urgent requests may operate in a second memory space, and large-postponable requests may operate in a third memory space, where each space is mutually exclusive of the others.

Therefore, the prioritizer 352 examines the memory address that the request seeks to access to determine priority. Those who are of ordinary skill in the art will understand and appreciate that other techniques may be used to determine priority. For example, a parameter may be associated with given requests that indicate a request's priority.

A queue-to-memory handler 360 selectively pulls requests off the queues and forwards them to the memory via output 362. The handler 360 sends requests from one of the queues to the memory when the memory is available.

Queue-Level-Dependent Background Request Submission

FIG. 4 shows the "queue-level-dependent background request submission" component. It includes a portion of the other hardware 314, a queue-level monitor 365, a high-priority queue-monitor line 374, a low-priority queue-monitor line 384, queue-level signal line(s) 392, a high-priority background request line 376, a low-priority background request line 386, and background request line(s) 394.

Of course, those of ordinary skill in the art understand that each of these lines may be composed of multiple lines. Moreover, those of ordinary skill in the art understand that these lines may be replaced by one or more buses.

An alternative embodiment may only include one queue; thus, only one set of the above components. In addition, in an alternative embodiment, the background request line(s) 394 may feed directly into one of the queues rather then through the prioritizer 352.

These components function in a manner similar to a "virtual" third queue for memory access. Instead of being an actual queue, background agents 370 and/or 380 submit background tasks via line(s) 376, 386, 394 when an actual queue (such as 354 or 356) reaches a threshold level. The threshold level may be generally fixed, generally programmable, selectable on a task-by-task basis, selectable on an agent-by-agent basis, or some combination thereof. These background tasks are typically large-urgent for background agents 370 and large-postponable for background agents 380.

This "virtual" third queue works like this: The queue-level monitor 365 monitors the actual queues 354 and 356 via lines 374 and 384, respectively. The monitor 365 (or associated circuitry) sends a binary-coded signal across one or more queue-level line(s) 392. When this signal indicates a triggering threshold level of a queue, the background agents (such as 370 and 380) submit requests to be placed in the queue at the requisite level. Again, this triggering threshold level may vary depending upon the task, the agent, and other variables.

Typically, the background agents of 380 perform background tasks that are large-postponable; therefore, they tasks are typically queued in the low-priority queue 356. Typically, the background agents of 370 perform background tasks that are large-urgent; therefore, they are typically queued in the high-priority queue 354. However, there may be overlap between these two groups of agents. In other words, some agents may be part of groups 370 and 380.

Priority and Pre-emption

If there are any requests in the high-priority queue 354, the handler 360 allows all requests in that queue access to the memory 316 before allowing any requests in the low-priority queue access. In other words, the handler gives the requests in the high-priority queue higher priority than those in the low-priority queue. This way the handler assures that the quick-urgent requests are always given access to the memory before the large-postponable ones. Therefore, a quick-urgent request is never waiting around behind one or more large-postponable requests. In other words, a quick-urgent request "jumps in line" in front of all of the waiting large-postponable requests regardless of when the quick-urgent request arrives.

Furthermore, the handler will pre-empt (i.e., interrupt) the memory access of a low-priority request to accommodate a newly arrived quick-urgent request. For example, suppose that the high-priority queue 352 is empty and the memory is being accessed based upon a large-postponable request that was in the low-priority queue 356. The handler will interrupt the on-going access (based upon the low-priority request) to provide nearly immediate access to the newly arrived high-priority request. After the high-priority queue is empty again, the low-priority request may again have access to memory.

To be more specific, although the handler will pre-empt the memory access of a low-priority request, it will wait for a natural point to interrupt the low-priority access. Tasks typically have natural break points where subtasks are completed. Moreover, there are natural data boundaries (e.g., burst boundaries) where task may be cleanly interrupted.

Out-of-Order Prioritization

In addition to prioritizing a request as low or high and placing them in the appropriate queue (high-priority queue 354 or low-priority queue 356), the prioritizer 352 may further prioritize requests in the queues. In so doing, requests in a queue may be performed "out of order" from the order in which they arrived. For example, since a process typically is waiting for the results of a read request, such requests are often bumped up to the top of the queue so that they are performed before write requests.

The exemplary manager, described herein, provides a mechanism for background-type tasks of background agents to access memory when the memory is idle as indicated by queue-level signal line(s).

All of the components of the MMU 312 are hardware-based. Likewise, all of the components of the common memory subsystem 301 are hardware-based.

Hardware-Based

MMU 312 includes hardware-based memory management logic in the form of an application-specific integrated circuit (ASIC). An example of the term "hardware-based" includes at least one physical logic component that does not retrieve and execute instructions from program memory. Rather, this exemplary physical logic component has dedicated, interconnected logic elements that process signals and data. Although hardware-based logic such as this is less flexible than a microprocessor or other instruction-based processors, hardware-based logic is much faster than instruction-based logic.

Moreover, such hardware-based logic is faster than an interrupt-driven processor because it need not rely on reception of interrupts and interpreting such interrupts to perform a task. Therefore, such hardware-based logic may perform functions (such as managing memory) between clock cycles (such as those for a bus or processor).

Based upon its ordinary meaning and the description provided herein, those of ordinary skill in the art understand the meaning of "hardware-based."

Methodological Implementation of the Exemplary Manager

Figure 5:
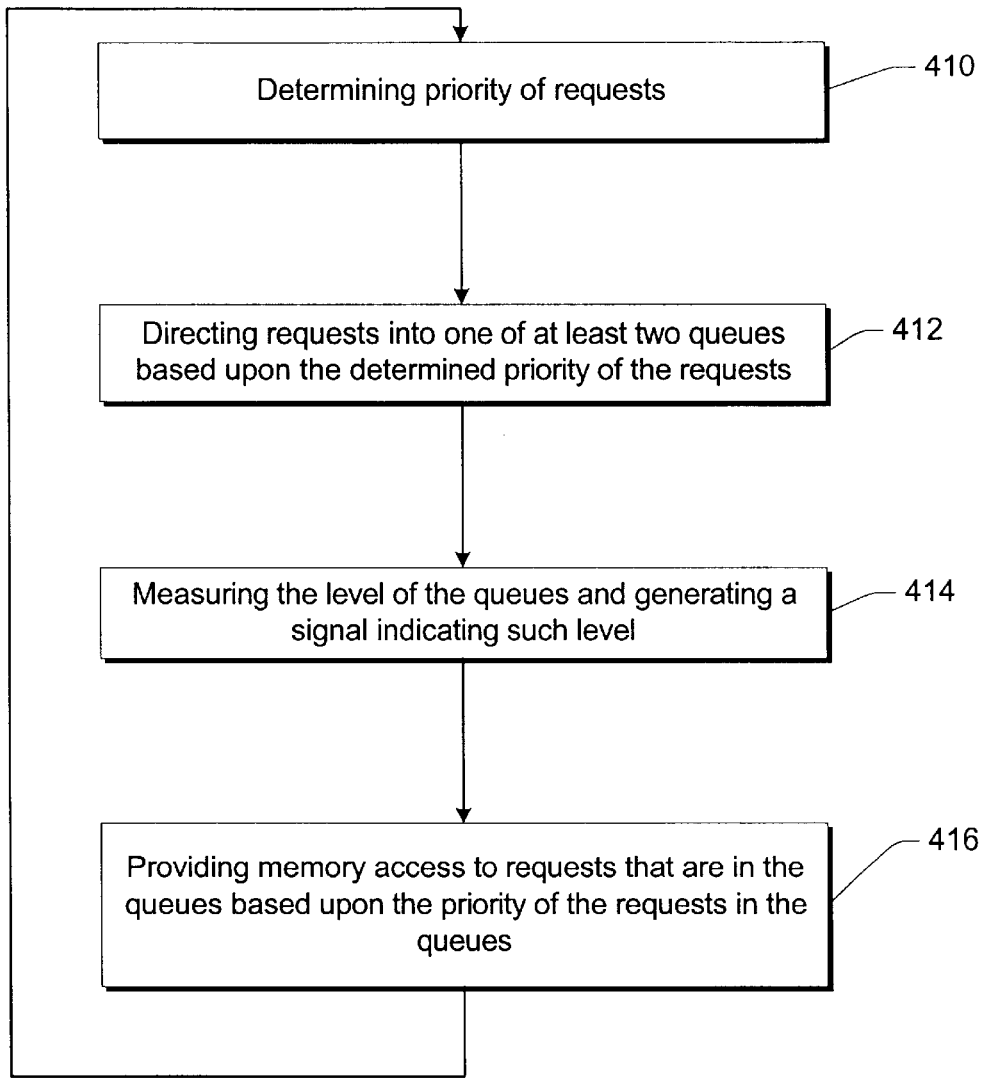
FIG. 5 is a flow diagram of an example of a methodological implementation of the invention claimed herein.

FIG. 5 shows a methodological implementation of the exemplary manager performed by the MMU 312 (or a portion thereof). This methodological implementation may be performed by one or more hardware-based modules.

At 410, the MMU determines the priority of requests from multiple agents. At 412, the MMU directs such requests into one of at least two queues based upon the determined priority of the requests. Short-urgent requests are directed into the high-priority queue and the large-postponable and large-urgent requests are directed to the low-priority queue. Alternatively, the large-urgent requests may be placed in the high priority queue. As the names imply, the requests in the high-priority queue have a higher priority than the requests in a low-priority queue. In addition, the MMU may further prioritize the requests within one (or both) of the queues.

At 414 of FIG. 5, the MMU monitors the queue level to determine the number of requests remaining (i.e., the cardinality of remaining requests) in the queues. The MMU signals this level to background agents. Such agents may submit requests if the queue level is at a given threshold (which may vary depending upon customization).

At 416, the MMU provides memory access to requests that are in the queues. The requests in the high-priority queue are provided access before requests in the low-priority queue. In addition, the measurement of the queue-level-dependent background request submission determines the rate at which the MMU allows memory access for the requests in the queues.

Furthermore, the MMU may pre-empt (i.e., interrupt) a memory access of a low-priority request to accommodate a newly arrived quick-urgent request.

Some of these steps may be performed concurrently and these steps are repeated as long as the memory system is operational.

Conclusion

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A hardware-based memory management system for use with a common primary memory shared by multiple entities, wherein each entity is configured to request access to the common primary memory, the system comprising:
    at least two request queues, each configured to receive requests from the multiple entities for access to the common memory and to hold such requests;
    a prioritizer configured to determine a priority of requests and direct a request into one of the queues based upon the determined priority of the request, wherein the prioritizer directs requests into the first queue that generally are performed faster than requests directed into the second queue;
    queue-to-memory handler configured to provide memory access for the requests in the queue;
    a queue-level signaler configured to determine the cardinality of requests remaining in the queue and generate a signal specifying the determined cardinality.

2. A system as recited in claim 1, wherein the signal further indicates to at least one of the multiple entities that such entity may submit at least one new request to the queue.

3. A system as recited in claim 1 further comprising a background entity configured to receive the signal and submit a new request to the queue when the signal indicates that the cardinality of requests in the queue is at a defined threshold.

4. A system as recited in claim 1 further comprising a background entity configured to receive the signal and submit a new request to the queue when the signal indicates that the cardinality of requests in the queue is at or below a defined threshold.

5. A system as recited in claim 1, wherein the hardware-based memory management system is embodied as, at least part of, an application specific integrated circuit (ASIC).

6. A system as recited in claim 1, wherein the handler provides access to the memory at a rate independent of a rate at which requests are queued.

7. A primary-common memory management module comprising:
    a first queue means for receiving and holding requests from multiple entities to access a primary-common memory configured to request access to the primary-common memory;
    a second queue means for holding requests which are waiting for access and have a lower priority than the requests in the first queue means;
    a queue-to-memory handling means for providing primary-common memory access to requests that are in the queues;
    a request-prioritizing means for prioritizing requests for primary-common memory access and directing requests into the first queue means that generally are performed faster than requests directed into the second queue means;
    a queue-level determining means for determining the cardinality of requests remaining in at least one of the queues;
    a queue-level signaling means for specifying the cardinality of requests remaining in at least one of the queues.

8. A module as recited in claim 7, the module being embodied as at least part of an application specific integrated circuit (ASIC).

9. With a primary-common memory management module configured to manage access to a primary-common memory shared by multiple entities, wherein each entity is configured to request access to the common primary memory, the memory management module being embodied as an application-specific integrated circuit (ASIC), a method comprising the step of:
    queueing requests to access a primary-common memory into either a first or second queue, such requests being received from the multiple entities;
    arbitrating primary-common memory access for the requests the queue;
    determining a priority of requests and direct a request into one of the queues based upon the determined priority of the request, wherein the prioritizer directs requests into the first queue that generally are performed faster than requests directed into the second queue;
    determining the number of request remaining in at least one of the queues; and
    generating a queue-level signal indicating the number of requests remaining in at least one queue.

10. A method as recited claim 9, wherein the signal further indicates to at least one of the multiple entities that such entity may submit at least one new request to the queue.

11. A method as recited claim 9, wherein the arbitrating step comprises arbitrating access to the memory at a rate independent of a rate at which requests are queued.

12. A system as recited in claim 1 wherein the queue-to-memory handler is configured to provide primary-common memory access to requests in the queues, wherein requests in the first queue are provided access before requests in the second queue.

* * * * *